United States Patent
Ratschmann

(10) Patent No.: US 9,109,729 B2
(45) Date of Patent: Aug. 18, 2015

(54) DEVICE FOR CONNECTING A PLASTIC TUBE TO A CONNECTION NIPPLE

(75) Inventor: Elmar Ratschmann, Hellmonsoedt (AT)

(73) Assignee: KE-KELIT Kunststoffwerk Gesellschaft m.b.H., Linz (AT)

( * ) Notice: Subject to any disclaimer, the term of this patent is extended or adjusted under 35 U.S.C. 154(b) by 301 days.

(21) Appl. No.: 13/575,728

(22) PCT Filed: Jun. 1, 2010

(86) PCT No.: PCT/AT2010/000191
§ 371 (c)(1),
(2), (4) Date: Jul. 27, 2012

(87) PCT Pub. No.: WO2011/097658
PCT Pub. Date: Aug. 18, 2011

(65) Prior Publication Data
US 2012/0313369 A1    Dec. 13, 2012

(30) Foreign Application Priority Data
Feb. 10, 2010 (AT) .................... A 180/2010

(51) Int. Cl.
*F16L 33/207* (2006.01)
*F16L 13/14* (2006.01)

(52) U.S. Cl.
CPC .......... *F16L 13/143* (2013.01); *F16L 33/2073* (2013.01); *F16L 2201/10* (2013.01)

(58) Field of Classification Search
CPC ......... F16L 33/22; F16L 33/227; F16L 33/30; F16L 13/143; F16L 33/2073; F16L 2201/10

USPC .................................. 285/239, 242, 240, 257
See application file for complete search history.

(56) References Cited

U.S. PATENT DOCUMENTS

| 2,481,730 A * | 9/1949 | Doerr | 285/148.15 |
| 2,759,769 A * | 8/1956 | Munro | 239/548 |
| 5,921,592 A * | 7/1999 | Donnelly | 285/340 |
| 6,676,173 B2 * | 1/2004 | Donnelly | 285/373 |

FOREIGN PATENT DOCUMENTS

| DE | 102006030777 A1 | 1/2008 |
| EP | 1 245 892 | 10/2002 |
| EP | 1 653 142 | 5/2006 |
| EP | 2038573 B1 | 3/2009 |
| EP | 2 154 411 | 2/2010 |

OTHER PUBLICATIONS

International Search Report of PCT/AT2010/000191, date of mailing Feb. 18, 2011.

* cited by examiner

*Primary Examiner* — James Hewitt
(74) *Attorney, Agent, or Firm* — Collard & Roe, P.C.

(57) ABSTRACT

A device includes a connection nipple for connecting to a plastic tube. The connection end of the plastic tube, which is provided with a frontal chamfer at least in the area of the internal diameter, is axially fixed between the connection nipple and a clamping sleeve with at least one sealing ring held interposed in the profiled connection nipple. The connection nipple has at least one radially outwardly protruding stop, which is displaceable radially inward via the frontal chamfer in the area of the internal diameter of the connection end, the stop being situated in front of the sealing ring viewed in the insertion direction.

3 Claims, 3 Drawing Sheets

1

DEVICE FOR CONNECTING A PLASTIC TUBE TO A CONNECTION NIPPLE

CROSS REFERENCE TO RELATED APPLICATIONS

This application is a National Stage of PCT/AT2010/000191 filed on Jun. 1, 2010, which claims priority under 35 U.S.C. §119 of Austrian Application No. A 180/2010 filed on Feb. 10, 2010 the disclosure of which is incorporated by reference. The international application under PCT article 21(2) was not published in English.

FIELD OF THE INVENTION

The invention relates to a device for connecting a plastic tube to a connection nipple, the connection end of the plastic tube, which is provided with a frontal chamfer in the area of the internal diameter, being axially fixed between the connection nipple and a clamping sleeve with a sealing ring, which is held in the profiled connection nipple, being interposed.

DESCRIPTION OF THE PRIOR ART

In order to fasten plastic tubes to which a pressure medium is applied, for example, pipe for water lines in the area of household installations, on a connection nipple of a fitting so they are secure from being pulled off, clamping the plastic tube, which is pushed onto the connection nipple, which is provided with a profile, between the connection nipple and a clamping sleeve enclosing the plastic tube is known. The seal between the connection nipple and the plastic tube is ensured by at least one sealing ring inserted into a peripheral recess of the connection nipple, over which the plastic tube must be pushed onto the connection nipple. For this purpose, the connection end of the plastic tube is provided frontally in the area of its internal diameter with a chamfer, which presses the sealing ring into the recess with an elastic deformation as the plastic tube is pushed onto the connection nipple. If such a chamfer is omitted or is inadequate, the danger exists that the sealing ring, which strikes against the front face of the plastic tube, will be forced out of the recess as the plastic tube is pushed onto the connection nipple and displaced along the connection nipple, which in turn endangers the required seal between connection nipple and plastic tube, without this endangerment being recognized, because the clamping sleeve, between which and the connection nipple the plastic tube is inserted, conceals the sealing ring.

SUMMARY OF THE INVENTION

The invention is therefore based on the object of designing an alternative device for connecting a plastic tube to a connection nipple of the type described at the beginning so that an impermissible displacement of the sealing ring or damage to the sealing ring is prevented as the plastic tube is connected to the connection nipple.

The invention achieves the stated object in that the connection nipple has at least one stop, which protrudes radially outward and can be displaced radially inward by means of the frontal chamfer in the area of the internal diameter of the connection end, the stop being situated in front of the sealing ring viewed in the insertion direction.

As a result of this measure, if an attempt is made to push a connection end of a plastic tube which is not chamfered or is inadequately chamfered onto the connection nipple, as a result of its correspondingly selected dimensions, the stop forms a stop surface, which inhibits the pushing of the plastic tube onto the connection nipple, with the front face facing toward the connection end of the plastic tube. However, with a properly chamfered plastic tube, the chamfer represents an intake surface for the stop, which is radially compressed to the internal diameter of the plastic tube as the plastic tube is pushed onto the connection nipple and releases the pathway for the plastic tube to be pushed on into the connection position. Multiple stops are optionally provided distributed around the connection nipple circumference.

According to an advantageous embodiment of the invention, which can optionally also be retrofitted, in the connection position of the plastic tube, the connection nipple has a receptacle for a lock ring on the side of the sealing ring opposite to the front side of the connection end, from which spring attachments having the stops protrude against to the pushing-on direction of the plastic tube, which are implemented as radially springy, the free ends of the spring attachments having a distance to the connection nipple axis in the extended state which is larger than the internal radius of the plastic tube but smaller than the external radius of the chamfer of the connection end of the plastic tube.

The lock ring, which is equipped with the spring elements according to the invention, thus also prevents the connection of a plastic tube which is inadequately prepared for such a connection and therefore damage to or undesired displacements of the at least one sealing ring. The spring attachments essentially span a funnel, i.e., form funnel segments which expand toward the pushing-on end of the connection nipple:

In order to prevent damage to the lock ring through incorrect handling of the device, in particular by pushing on non-chamfered tubes using excessive force, it is advisable for at least three spring attachments, which are preferably situated uniformly distributed around the lock ring circumference, to protrude from the connection nipple or from the lock ring at least approximately coaxially to the ring or connection nipple axis.

In order that the lock ring is seated well on the connection nipple, guide attachments in the form of cylindrical segments, which optionally protrude beyond the spring attachments in the axial direction, can protrude from the lock ring between the spring attachments forming the stops. The lock ring is pushed onto the connection nipple by means of a press fit, for example, in order to be inserted into a groove in the connection nipple or be glued, welded, or permanently connected in another way to the connection nipple. In the simplest case, connection nipple and stops form a component manufactured from one material.

BRIEF DESCRIPTION OF THE DRAWING

The object of the invention is shown for exemplary purposes in the drawing. In the figures.

DESCRIPTION OF THE PREFERRED EMBODIMENT

Figure 1:
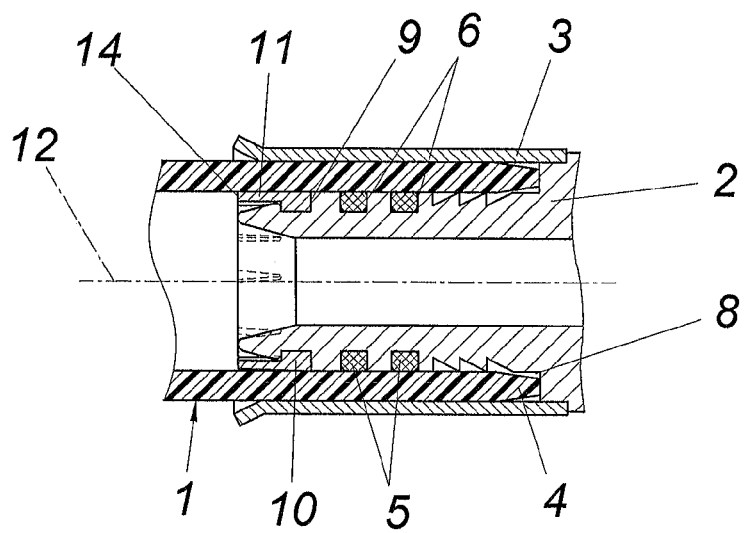
FIG. 1 shows a device according to the invention for connecting a plastic tube to a connection nipple having a plastic tube correctly pushed onto the connection nipple in a simplified axial section.

The illustrated device for connecting a plastic tube 1 to a connection nipple 2 of a fitting (not shown in greater detail)

has a clamping sleeve 3, between which and the connection nipple 2 the connection end 4 of the plastic tube 1 is to be inserted, in order to subsequently be fixedly clamped via the clamping sleeve 3 on the profiled connection nipple 2, for example, by pressing in peripheral beads. The seal between the connection nipple 2 and the connection end 4 of the plastic tube 1 is produced with the aid of two sealing rings 5, which are to be inserted into peripheral grooves 6 of the connection nipple 2. In order that the sealing rings 5, which protrude in the unloaded state beyond the outer circumference of the connection nipple 2, cannot be forced out of the grooves 6 as the end section 4 of the plastic tube 1 is pushed into the ring gap between the connection nipple 2 and the clamping sleeve 3, the front side 7 of the connection end 4 of the plastic tube 1 is provided with a chamfer 8, as can be inferred from FIGS. 1 and 2.

In order that a plastic tube 1 which is not chamfered or is inadequately chamfered can be prevented from being pushed over the sealing ring 5 onto the connection nipple 2 into the predefined connection position, the connection nipple 2 has at least one stop 14, which protrudes radially outward and is displaceable radially inward by means of the frontal chamfer 8 in the area of the internal diameter of the connection end 4, the stop 14 being situated in front of the sealing ring 5 viewed in the insertion direction.

Figure 2:
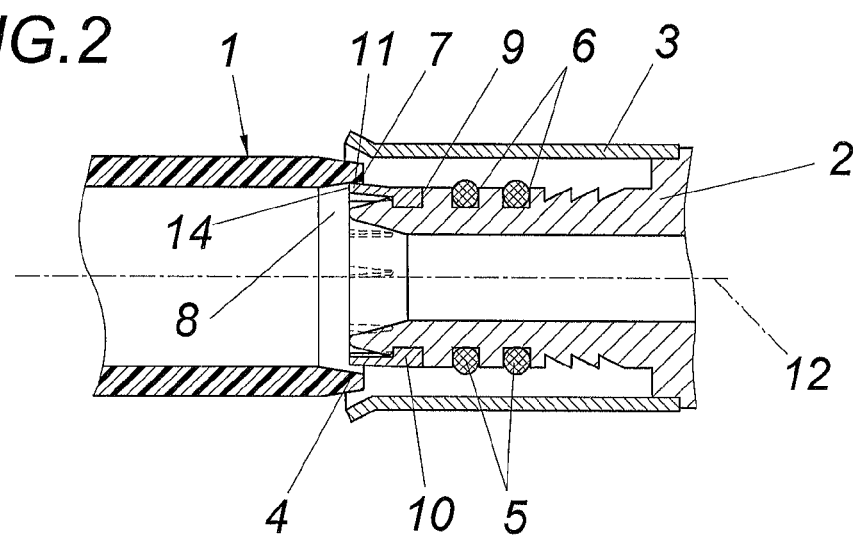
FIG. 2 shows the device according to FIG. 1 having an intermediate position of the plastic tube as it is pushed on, FIG. 3 shows a view corresponding to FIG. 2 having a non-chamfered plastic tube.
Figure 3:
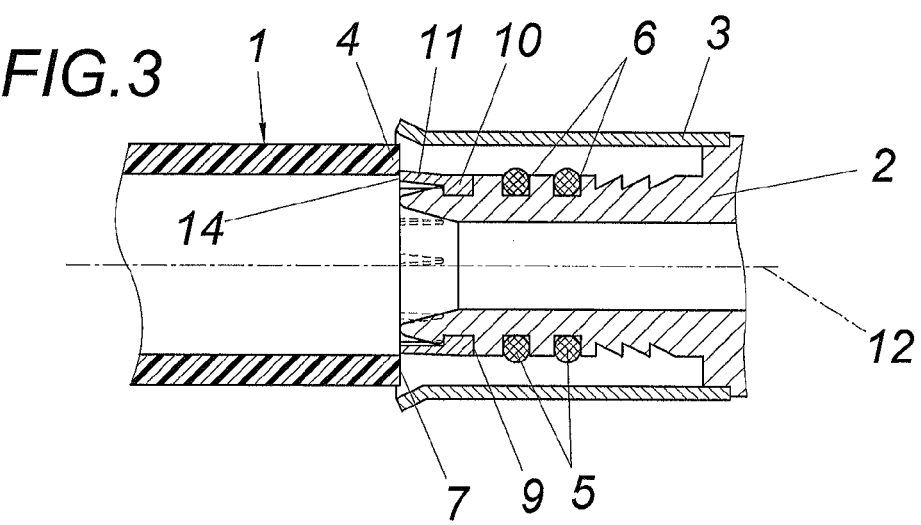

According to FIGS. 1 to 3, a lock ring 10 which is inserted into a receptacle 9 of the connection nipple 2 is provided on the side of the sealing rings 5 opposite to the front side 7 of the connection end 4 in the connection position of the plastic tube 1 (FIG. 1). Spring attachments 11, which are implemented as radially springy, protrude from the lock ring 10 opposite to the pushing-on direction of the plastic tube 1, the free ends of the spring attachments 11 forming the stops 14, which have an external distance to the connection nipple axis 12 in the extended state which is larger than the internal radius of the plastic tube 1, but is smaller than the external radius of the chamfer 8 of the connection end 4 of the plastic tube 1.

Figure 4:
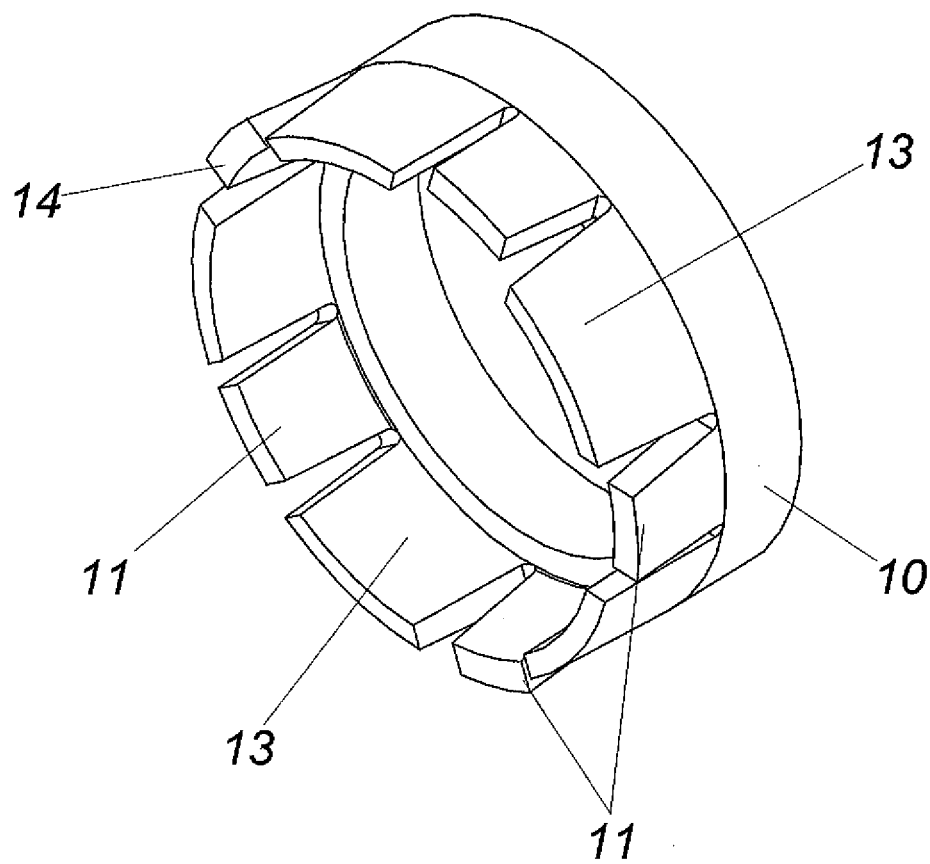
FIG. 4 shows a design variant of a lock ring in an enlarged diagonal view.

Five spring attachments 11, which are uniformly distributed around the lock ring circumference, protrude from the lock ring 10 shown in FIG. 4, at least approximately coaxially to the ring or connection nipple axis 12. Guide attachments 13 in the form of cylindrical segments protrude from the lock ring 10 between the spring attachments 11, which can protrude beyond the spring attachments 11 in the axial direction.

Accordingly, if a properly chamfered plastic tube 1 is pushed onto the connection nipple 2 according to FIG. 2, the chamfer 8 of the connection end 4 forms an intake surface for the stops 14 of the spring attachments 11, which retract radially inward along this intake surface and release the pathway to the sealing rings 5, over which the connection end 4 of the plastic tube 1 can be pushed into the connection position according to FIG. 1. However, if the connection end 4 of the plastic tube 1 has no chamfer or an inadequate chamfer 8, the front side 7 of the connection end 4 of the plastic tube 1 strikes against the front faces of the spring attachments 11 facing toward the front side 7, i.e., the stops 14, with the result that the connection end 4 of the plastic tube 1 can no longer be inserted further into the ring gap between connection nipple 2 and clamping sleeve 3 (FIG. 3). As a result of the recognizable incomplete pushing of the plastic tube 1 onto the connection nipple 2, the plastic tube 1 must be pulled back off of the connection nipple 2 and chamfered appropriately before the connection, before the connection can be performed.

Figure 5:
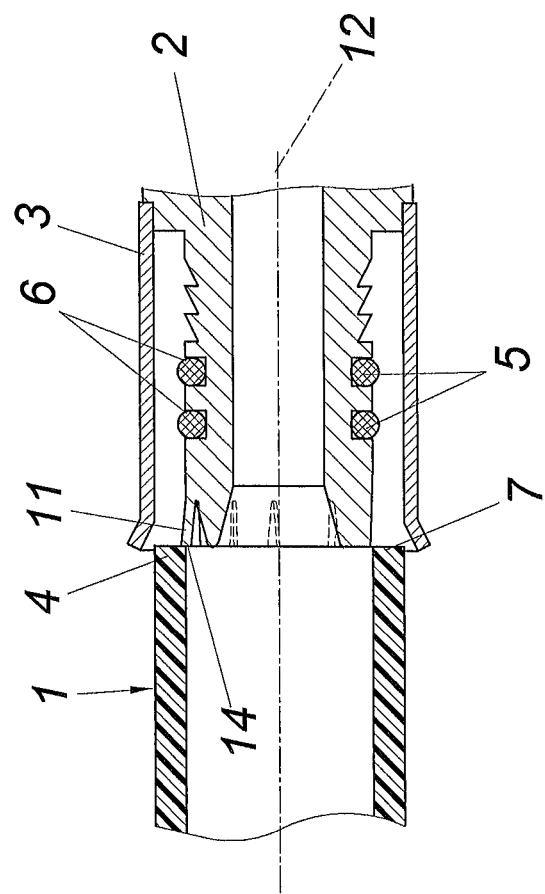
FIG. 5 shows a design variant of the device from FIG. 3.

In the simplest case, the connection nipple 2, the spring attachments 11, and the stops 14 form a part manufactured from one material (FIG. 5). The axial location of the stops 14 on the connection nipple can be selected freely by a person skilled in the art as long as the stops 14 are situated in front of the sealing ring 5 viewed in the insertion direction.

The invention claimed is:

1. A tube connection comprising:
a connection nipple having a retaining groove;
a plastic tube inserted onto said connection nipple in a connection position, said plastic tube comprising a connection end wherein a front side of said connection end is provided with a chamfered wall;
a plurality of sealing rings inserted in associated peripheral grooves of said connection nipple;
a clamping sleeve which in a clamping position secures said plastic tube axially against said connection nipple;
a locking ring inserted into said retaining groove and arranged on one side of said plurality of sealing rings in said connection position, wherein said front side of said connection end of said plastic tube is arranged on the other side of said plurality of sealing rings in said connection position;
said locking ring comprising;
a plurality of elastic tabs protruding around a circumference of said locking ring, said plurality of elastic tabs comprising a plurality of free ends forming a plurality of stops; and
a plurality of guide tabs comprising cylindrical segments protruding from said locking ring between said elastic tabs, said guide tabs protruding beyond said elastic tabs in an axial direction;
wherein said chamfered wall of said front side of said connection end of said plastic tube forms a receiving surface for said stops of said elastic tabs, which elastic tabs retract radially inwardly along said receiving surface and release a path to said sealing rings on which path said connection end of said plastic tube is pushed toward said connection position.

2. The tube connection according to claim 1, wherein a distance from said free ends of said elastic tabs in an extended state to a connection nipple axis is greater than an internal radius of said plastic tube but smaller than an external radius of said chamfered wall of said front side of said connection end of said plastic tube.

3. The tube connection according to claim 1 wherein said plurality of elastic tabs comprises at least three elastic tabs protruding from said locking ring.

* * * * *